(12) United States Patent
Webster et al.

(10) Patent No.: US 7,949,068 B2
(45) Date of Patent: May 24, 2011

(54) SYSTEMS AND METHODS FOR TRANSMITTER DIVERSITY

(75) Inventors: Mark A Webster, Indian Harbor, FL (US); Deniz Rende, West Melbourne, FL (US); Jim E. Petranovich, La Jolla, CA (US)

(73) Assignee: Xocyst Transfer AG L.L.C., Wilmington, DE (US)

( * ) Notice: Subject to any disclaimer, the term of this patent is extended or adjusted under 35 U.S.C. 154(b) by 0 days.

(21) Appl. No.: 12/698,090

(22) Filed: Feb. 1, 2010

(65) Prior Publication Data
US 2010/0166107 A1    Jul. 1, 2010

Related U.S. Application Data

(63) Continuation of application No. 11/411,619, filed on Apr. 26, 2006, now Pat. No. 7,668,258.

(60) Provisional application No. 60/275,203, filed on Apr. 26, 2005.

(51) Int. Cl.
*H04L 27/00*    (2006.01)
(52) U.S. Cl. ........................................................ 375/295
(58) Field of Classification Search ................. None
See application file for complete search history.

(56) References Cited

U.S. PATENT DOCUMENTS

| | | | |
|---|---|---|---|
| 6,377,632 B1 | 4/2002 | Paulraj et al. | |
| 6,590,889 B1 * | 7/2003 | Preuss et al. | 370/342 |
| 6,801,579 B1 * | 10/2004 | Hassibi et al. | 375/264 |
| 7,099,269 B2 | 8/2006 | Van Nee | |
| 7,356,090 B2 * | 4/2008 | Hwang et al. | 375/295 |
| 7,430,244 B2 * | 9/2008 | Chung et al. | 375/267 |
| 7,436,903 B2 | 10/2008 | Sandhu et al. | |
| 7,539,463 B2 | 5/2009 | Himayat et al. | |
| 2003/0076891 A1 | 4/2003 | Won | |
| 2007/0274411 A1 * | 11/2007 | Lee et al. | 375/267 |

OTHER PUBLICATIONS

International Preliminary Report on Patentability for PCT/US2006/016125, issued Oct. 30, 2007.
International Search Report and Written Opinion for PCT Application No. PCT/US2006/16125 mailed Mar. 2, 2007.
International Search Report, PCT Application No. PCT/US06/16125, Mar. 2, 2007.

* cited by examiner

*Primary Examiner* — Khanh C Tran

(57) ABSTRACT

Methods and systems for transmitter diversity expansion are provided. The methods and systems include steps and modules for applying a number of data streams (K) to a larger number of antennas (N). This is performed by applying each of the data streams to a single base antenna, such that K data streams are applied to K base antennas, and by shifting and combining the K data streams to produce N-K data streams to apply to N-K extension antennas.

25 Claims, 13 Drawing Sheets

SYSTEMS AND METHODS FOR TRANSMITTER DIVERSITY

CROSS-REFERENCE TO RELATED APPLICATION

This application is a continuation of application Ser. No. 11/411,619, filed on Apr. 26, 2006, which claims priority to U.S. provisional application No. 60/675,203, filed Apr. 26, 2005. The entire contents of application Ser. Nos. 11/411,619 and 60/675,203 are hereby incorporated herein by reference.

TECHNICAL FIELD

The present disclosure is generally related to digital communications and, more particularly, is related to systems and methods for data transmission.

BACKGROUND

Communication networks come in a variety of forms. Notable networks include wireline and wireless. Wireline networks include local area networks (LANs), digital subscriber line (DSL) networks, and cable networks, among others. Wireless networks include cellular telephone networks, classic land mobile radio networks and satellite transmission networks, among others. These wireless networks are typically characterized as wide area networks. More recently, wireless local area networks and wireless home networks have been proposed, and standards, such as Bluetooth and IEEE 802.11, have been introduced to govern the development of wireless equipment for such localized networks.

A wireless local area network (WLAN) typically uses infrared (IR) or radio frequency (RF) communications channels to communicate between portable or mobile computer terminals and stationary access points or base stations. These access points are, in turn, connected by a wired or wireless communications channel to a network infrastructure which connects groups of access points together to form the LAN, including, optionally, one or more host computer systems.

Wireless protocols such as Bluetooth and IEEE 802.11 support the logical interconnections of such portable roaming terminals having a variety of types of communication capabilities to host computers. The logical interconnections are based upon an infrastructure in which at least some of the terminals are capable of communicating with at least two of the access points when located within a predetermined range, each terminal being normally associated, and in communication, with a single one of the access points. Based on the overall spatial layout, response time, and loading requirements of the network, different networking schemes and communication protocols have been designed so as to most efficiently regulate the communications.

IEEE Standard 802.11 ("802.11") is set out in "Wireless LAN Medium Access Control (MAC) and Physical Layer (PHY) Specifications" and is available from the IEEE Standards Department, Piscataway, N.J. IEEE 802.11 permits either IR or RF communications at 1 Mbps, 2 Mbps and higher data rates, a medium access technique similar to carrier sense multiple access/collision avoidance (CSMA/CA), a power-save mode for battery-operated mobile stations, seamless roaming in a full cellular network, high throughput operation, diverse antenna systems designed to eliminate "dead spots," and an easy interface to existing network infrastructures.

The 802.11a standard defines data rates of 6, 12, 18, 24, 36 and 54 Mbps in the 5 GHz band. Demand for higher data rates may result in the need for devices that can communicate with each other at the higher rates, yet co-exist in the same WLAN environment or area without significant interference or interruption from each other, regardless of whether the higher data rate devices can communicate with the 802.11a devices. It may further be desired that high data rate devices be able to communicate with the 802.11a devices, such as at any of the standard 802.11a rates.

One challenge in designing a wireless transmission system involves transmit beamforming using an antenna array. Beamforming focuses signals toward a receiver in such a way that they combine at the receiver resulting in a stronger signal. If signals are transmitted off multiple antennas and focused toward a designated receiver rather than being transmitted in an omni-directional fashion, the composite phase and amplitude of the transmission determines the effectiveness of the beam-forming. The phase and amplitude relationship between the transmit antennas is adjusted to focus this energy at the intended receiver. One way to adjust a beam-forming transmitter is to incorporate additional circuitry on the radio. The circuitry is used to compute and share the conditions observed by the receiver. The transmitter then performs a complex calculation to adjust the beamforming antenna array. However, this solution can be expensive.

Increasing the effective signal strength and/or receiver sensitivity enables more efficient communications. Increased signal strength may enable service providers to more effectively use their equipment. Consumers may realize a cost savings as well.

SUMMARY

Embodiments of the present disclosure provide systems and methods for transmitter diversity expansion.

Briefly described, in architecture, one embodiment of the system, among others, can be implemented with a bypass module configured to receive K data streams and to relay the K data streams to K antennas of a set of N antennas; and a diversity expansion module configured to provide N-K data streams for application to a set of N-K antennas based on the K data streams.

Embodiments of the present disclosure can also be viewed as providing methods for transmitter diversity expansion. In this regard, one embodiment of such a method, among others, can be broadly summarized by the following steps: receiving K data streams; providing each of the K data streams to K antennas of a set of N antennas for transmission; providing N-K data streams to N-K unused antennas of the set of N antennas based on the K data streams for transmission; and transmitting the N data streams on the N antennas.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the FIG. 1 is a block diagram of an open system interconnection (OSI) layered model for data transmission.

DETAILED DESCRIPTION

Disclosed herein are various embodiments of transmitter diversity expansion systems and methods. Such embodiments provide for the application of a number of data streams (K) to a larger number of antennas (N). One system embodiment comprises a module that applies each of the data streams to a base antenna, such that K data streams are applied to K base antennas. Also the system embodiment provides for shifting and combining of the K data streams to produce N-K data streams for application to N-K extension antennas. The described systems and methods may be embodied in any type of processor such as a PHY layer processor, though not limited to a PHY layer processor, including, but not limited to, a digital signal processor (DSP), a microprocessor (MCU), a general purpose processor, and an application specific integrated circuit (ASIC), among others.

A new standard is being proposed, referred to as IEEE 802.11n (the "802.11n proposal"), which is a high data rate extension of the 802.11a standard at 5 GHz and 802.11g at 2.4 GHz. Both of these standards use orthogonal frequency division multiplexing (OFDM), which is a signaling scheme which uses multiple, parallel tones to carry information. These tones are commonly called subcarriers. It is noted that, at the present time, the 802.11n proposal is only a draft and is not yet a completely defined standard. Other applicable standards include Bluetooth, xDSL, other sections of 802.11, etc. To increase the data rate, 802.11n is considering using multiple input, multiple output (MIMO) functionality which uses multiple transmit and receive antennas.

Figure 1:
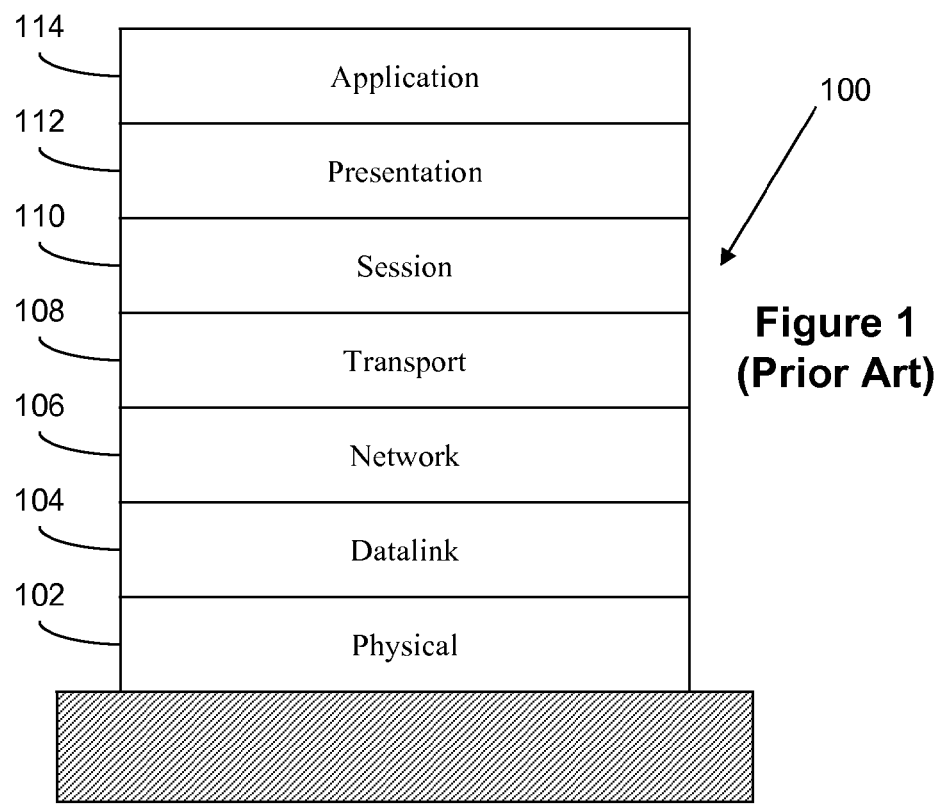

IEEE 802.11 is directed to wireless LANs, and in particular specifies the MAC and the PHY layers. These layers are intended to correspond closely to the two lowest layers of a system based on the ISO Basic Reference Model of OSI, i.e., the data link layer and the physical layer. FIG. 1 shows a diagrammatic representation of an open systems interconnection (OSI) layered model 100 developed by the International Organization for Standards (ISO) for describing the exchange of information between layers in communication networks. The OSI layered model 100 is particularly useful for separating the technological functions of each layer, and thereby facilitating the modification or update of a given layer without detrimentally impacting on the functions of neighboring layers.

At a lower most layer, the OSI model 100 has a physical layer or PHY layer 102 that is responsible for encoding and decoding data into signals that are transmitted across a particular medium. Above the PHY layer 102, a data link layer 104 is defined for providing reliable transmission of data over a network while performing appropriate interfacing with the PHY layer 102 and a network layer 106. The network layer 106 is responsible for routing data between nodes in a network, and for initiating, maintaining and terminating a communication link between users connected to the nodes. A transport layer 108 is responsible for performing data transfers within a particular level of service quality. A session layer 110 is generally concerned with controlling when users are able to transmit and receive data. A presentation layer 112 is responsible for translating, converting, compressing and decompressing data being transmitted across a medium. Finally, an application layer 114 provides users with suitable interfaces for accessing and connecting to a network. This OSI model 100 can be useful for transmissions between, for example, two stations.

Exemplary embodiments of the diversity expansion techniques for a transceiver can be processed in a PHY signal processor. A PHY signal processor is configured to perform functionality of the preferred embodiments. A digital communication system may comprise such a processor, alone, or in combination with other logic or components. A system of communications may further be embodied in a wireless radio, or other communication device. Such a communication device may include many wireless communication devices, including computers (desktop, portable, laptop, etc.), consumer electronic devices (e.g., multi-media players), compatible telecommunication devices, personal digital assistants (PDAs), or any other type of network devices, such as printers, fax machines, scanners, hubs, switches, routers, set-top boxes, televisions with communication capability, etc. A Medium Access Control (MAC) Protocol enables the exchange of channel information between stations. A transmitter may shift and combine data streams to achieve higher fidelity from the transmitter, thereby increasing the sensitivity of the receiver.

Exemplary embodiments of transmitter diversity expansion systems and methods described herein may be implemented in systems employing IEEE 802.11 protocols. IEEE 802.11 modes may be implemented to use multiple transmit and receive antennas. When multiple transmit antennas are used, various purposes may be served. One purpose may include sending more data through more antennas, or increasing the data capacity of a transmission. Data streams that are sent through a transmit channel may be called "spatial streams."

Another purpose for exploiting multiple transmit antennas is to send one data stream through multiple paths. For instance, one stream can be sent multiple times through multiple antennas to increase the strength of the receive signal at another station. Multiple copies of the data stream may be sent on multiple antennas to increase the reliability of the communication. To exploit two antennas in a transmitter, two separate data streams can be sent substantially simultaneously. This method is referred to as "spatial multiplexing." Alternatively, one spatial stream may be sent twice on the two antennas. One way of sending one spatial stream twice is space-time block coding (STBC) which may improve the reliability of the data link. A disadvantage of STBC is that the receiver has to know that the transmitter is using this technique. That is, the receiver has to know how to use this technique to recover the data. STBC is not seamless to the receiver. A goal for use of multiple antennas (e.g., two, three, four, etc.) is to send multiple data streams such that the receiver requires no special method to recover the data.

One way of accomplishing this latter goal is through beamforming, which may require extra communication overhead. An exemplary embodiment of transmitter diversity expansion systems and methods uses a technique in which an extra transmit antenna may be utilized without the receiver needing special decoding circuitry. Moreover, a receiver does not need to know whether or how this technique is applied at the transmitter. One mechanism to accomplish transmit diversity expansion is through the use of cyclic shifts. The amount of cyclic shifts that is used in the implementation is not important. That is, any appropriate cyclic shift amounts may be used. One system for performing the cyclic shifts is provided in FIG. 2.

Figure 2:
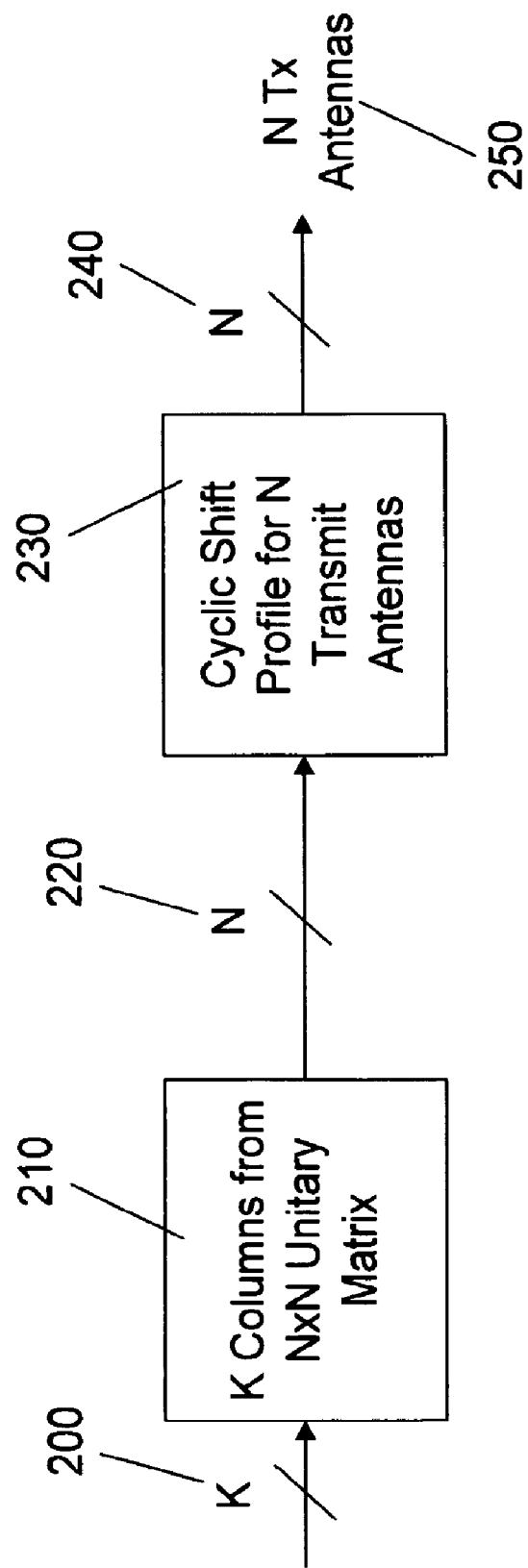
FIG. 2 is a block diagram of a prior art system for implementing transmitter diversity.

Referring to FIG. 2, a combining module 210 and a shifting module 230 is shown. A module as used herein, may be embodied in software, hardware, firmware, etc., or a combination of these embodiments. The combining module receives K spatial streams 200, where K is an integer value, greater than 1. The combining module 210 includes a unitary matrix or an extension matrix, which is applied to the K spatial streams. The matrix may be a fast Fourier transform matrix. This matrix may be a rectangular matrix, such that the output comprises N columns or rows 220 of data streams, where N is an integer value, greater than or equal to K. Since N is greater than or equal to K, K spatial streams 200 are mapped to N antennas 250. After the combining at combining module 210, a cyclic shift is applied to each of the N data streams at shifting module 230. The cyclic shift allows for the combination of the K spatial streams while enabling a discernment of the individual streams. The cyclic shift is applied to each of the N spatial streams independently. So, for a case of four spatial streams, in an exemplary embodiment, no cyclic shift is applied to the first stream of the four streams; a first cyclic shift is applied to the second stream of the four streams; a second cyclic shift is applied to the third of the four streams; and a third cyclic shift is applied to the fourth of the four streams. For example, if a two by two unitary matrix is applied to one spatial stream, they are added together, resulting in a one by two matrix.

Figure 3:
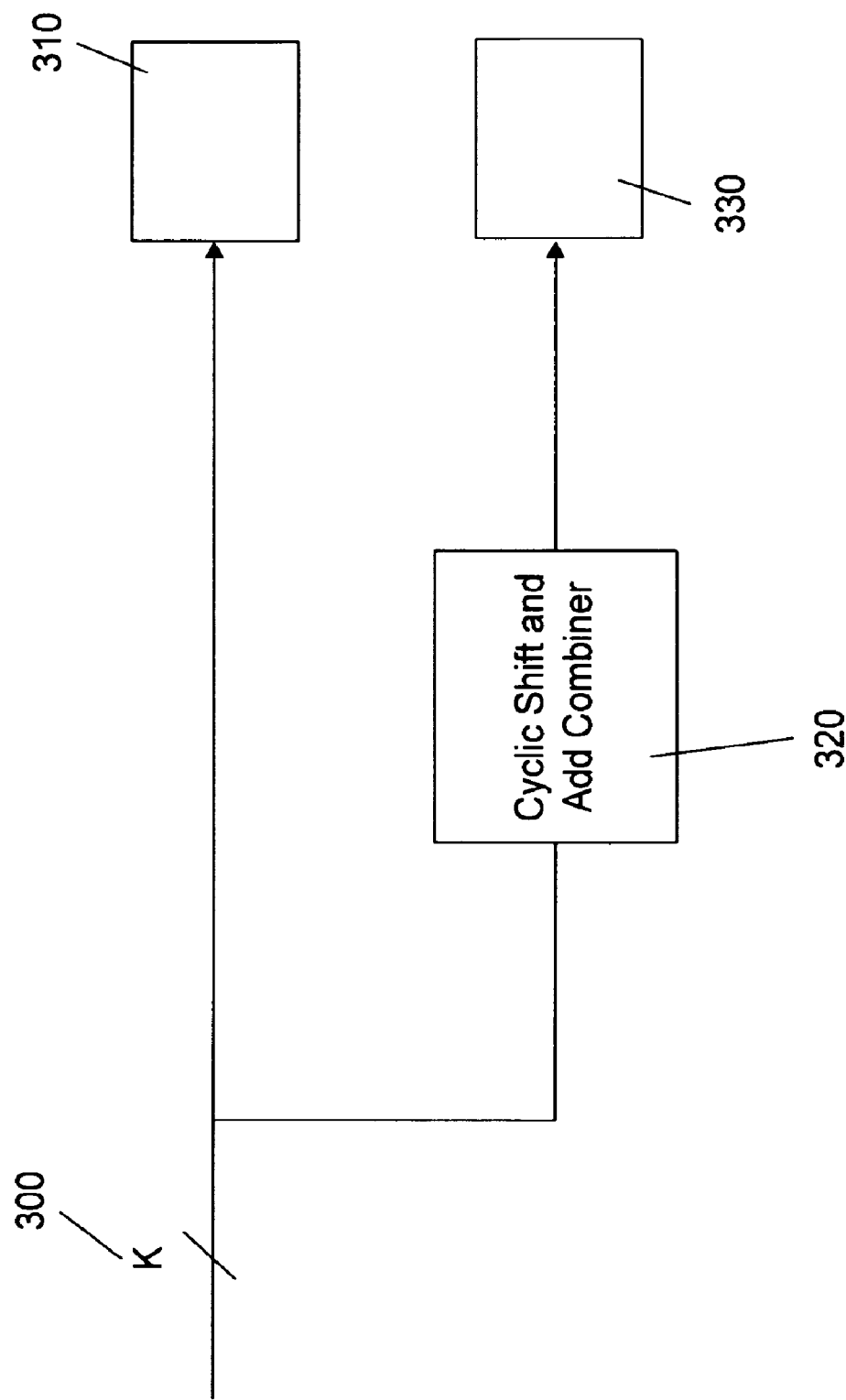
FIG. 3 is a block diagram of an exemplary embodiment of a system for transmitter diversity expansion according to the present disclosure.

Referring to FIG. 3, K spatial streams 300 are first passed to K base transmit antennas 310 out of a total of N transmit antennas 310, 330. The N antennas, 310, 330 comprise K base antennas 310 and K-N extension antennas 330. Then, the cyclic shift and unitary matrix are applied to the K spatial streams in module 320. Module 320 comprises functionality of modules 210 and 230 of FIG. 2. This result is applied to N-K extension antennas 330 of the N antennas 310, 330. So, K spatial streams 300 are applied to K base antennas 310 and N-K streams that have had a cyclic shift and unitary matrix applied to them are applied to N-K extension antennas 330. This is referred to herein as a "systematic mapping." This technique (systematic mapping) may be applied in the preamble portion of a packet. One advantage of such a method is that K streams 300 appear on K base antennas 310, which enables simple testing and verification. Because K transmit antennas can be connected directly to K receive antennas, the spatial streams 300 are decoded without the extension antennas 330. Then, when the extension antennas 330 are added, a verification may be performed to verify that the same results are received with the N antennas 310, 330 as were received with the K base antennas 310.

Figure 4:
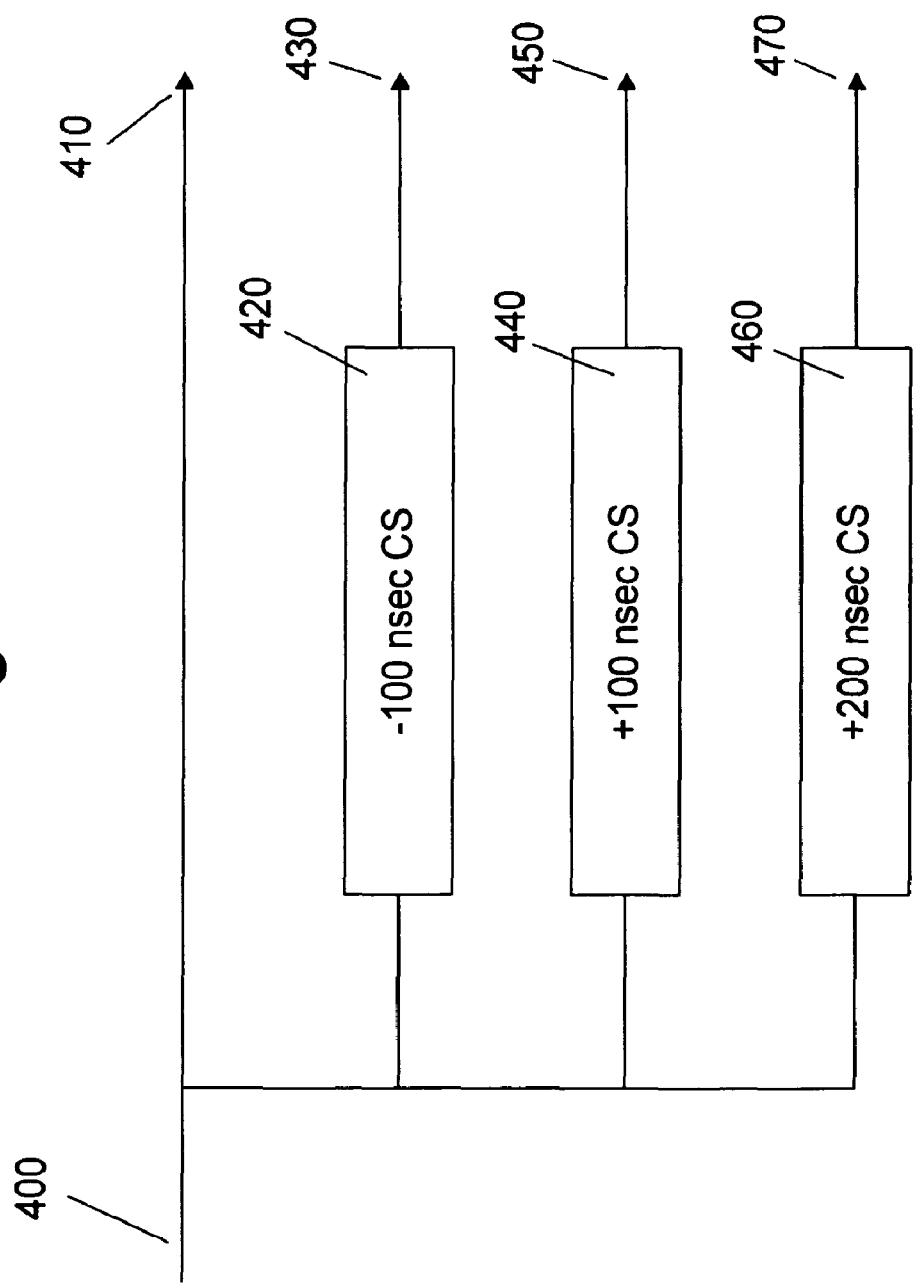
FIG. 4 is a detailed block diagram of an exemplary embodiment of the cyclic shift module of the system for transmitter diversity expansion of FIG. 3.

One non-limiting embodiment for applying a cyclic shift is shown in FIG. 4. Modules 420, 440, and 460 are embodied in cyclic shifting and combining module 320 of FIG. 3. The K data streams 400 are passed straight through to K base antennas 410. In module 420, a cyclic shift of −100 nanoseconds is applied to a spatial stream of K data streams 400. The output of module 420 is sent to stage 430, which may be a combination stage or an antenna, among other stages. At module 440, a +100 nanosecond cyclic shift is applied to a spatial stream of K data streams 400 and the output is sent to stage 450, which may be a combination stage or an antenna, among other stages. In module 460, a +200 nanosecond cyclic shift is applied to a spatial stream of K data streams 400 and the output is sent to stage 470, which may be a combination stage or an antenna, among other stages. In an exemplary embodiment, each of the cyclic shifted streams may be passed to a singular antenna of N-K antennas.

Figure 5:
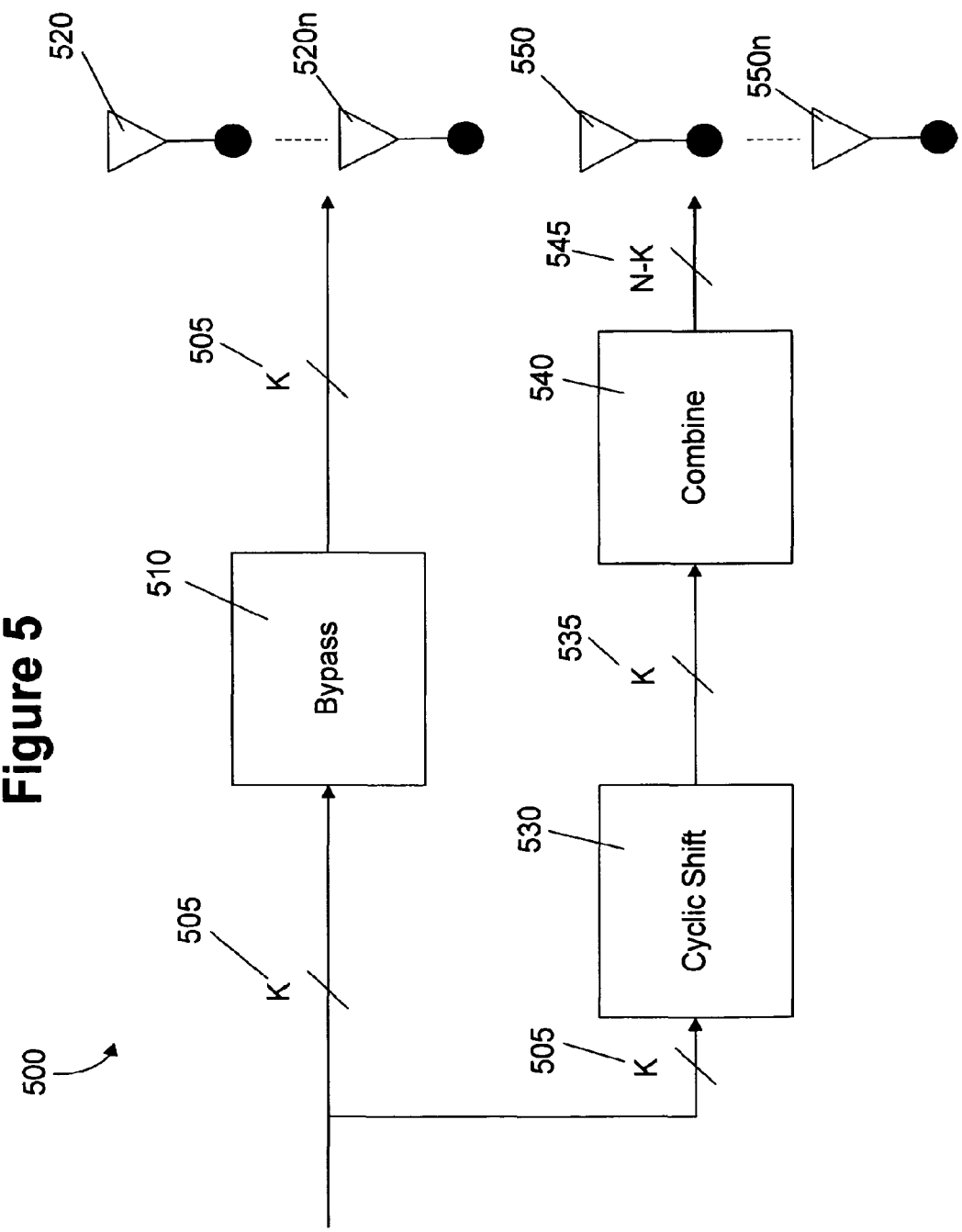
FIG. 5 is a block diagram of an exemplary embodiment of the system for transmitter diversity expansion of FIG. 3 with the cyclic shift module before the combine module.

Referring to FIG. 5, transmit diversity expansion system 500 including bypass module 510, cyclic shift module 530, and combining module 540 for expanding K data streams to N antennas is shown. K streams 505 are sent to bypass module 510 and sent unchanged to K base antennas 520 . . . 520n. Bypass module 510 may simply be electrical conduits to pass K streams 505 to K base antennas 520 . . . 520n. In cyclic shift module 530, a cyclic shift is applied to K streams 505 to provide K cyclic shifted streams 535. The K cyclic shifted streams 535 are then combined in combining module 540 to provide N-K streams 545. The N-K streams 545 are applied to N-K extension antennas 550 . . . 550n. So, spatial streams 505 pass through bypass module 510 and are applied to base antennas 520 . . . 520n. The spatial streams 505 are also sent to cyclic shift module 530, where various cyclic shift values are applied to each of spatial streams 505. In the case of two spatial streams, one may be shifted and one may not be. Alternatively, one can be shifted a positive amount and one shifted a negative amount, or one can be shifted a first amount and one can be shifted a second, different amount. The different amounts may be random or programmed. The shifted signals 535 are combined using a matrix, such that N-K extension streams 545 that are shifted and combined are sent to N-K extension antennas 550 . . . 550n.

In one embodiment, the expansion process comprises two steps, namely cyclic shifts and combining. Both steps are linear operations that can be represented with matrix multiplication, which may comprise two matrices: one for cyclic shifts and one for combining. The system of FIG. 5 may be represented as follows:

$$W_{ext} = W_{combine} * W_{cs}$$

where $W_{combine}$ is a matrix, which defines the combining operation and $W_{cs}$ is a matrix, which defines the cyclic shifts.

$W_{cs}$ is a diagonal matrix in which the diagonal elements are related to cyclic shift operations applied to the corresponding stream and all non-diagonal elements are zeros.

An exemplary combining matrix may be defined as follows $$W_{combine} = (1/\sqrt{Nss}) * \begin{bmatrix} 1 & 1 & 1 & 1 \\ 1 & -1 & 1 & -1 \\ 1 & 1 & -1 & -1 \\ 1 & -1 & -1 & 1 \end{bmatrix}$$

The $W_{combine}$ matrix has a Walsh-Hadamard construct. The matrix is trimmed as needed. N-K rows are retained for N-K extension antennas. K columns are retained for the K spatial streams. The matrix left-multiplies the column vector of the base signals. The vector of the base signals is loaded in the order of the K streams, with the first stream as the first (top) element in the column vector. The matrix output vector is sent to the cyclic shift module (e.g., such as module 530). Power normalization may be achieved by using a scaling constant (Nss in the equation above), such that the extension antennas (N-K antennas) are power-consistent with the base antennas (K antennas).

An exemplary cyclic shift matrix may be defined as follows:

$$W_{cs} = \begin{bmatrix} 1 & 1 & 1 & 1 \\ 1 & -1 & 1 & -1 \\ 1 & 1 & -1 & -1 \\ 1 & -1 & -1 & 1 \end{bmatrix}$$

This matrix is a diagonal matrix of cyclic shift operators. The cyclic shift matrix is trimmed as needed to N-K by N-K, where N-K is the number of extension antennas. An exemplary method embodiment for extending two data streams to two extension antennas for a total of four antennas is represented as follows:

$$\begin{bmatrix} Extend1 \\ Extend2 \end{bmatrix} = \begin{bmatrix} CS1 & 0 \\ 0 & CS2 \end{bmatrix} \begin{bmatrix} 1 & 1 \\ 1 & -1 \end{bmatrix} \begin{bmatrix} Base1 \\ Base2 \end{bmatrix}$$

Figure 6:
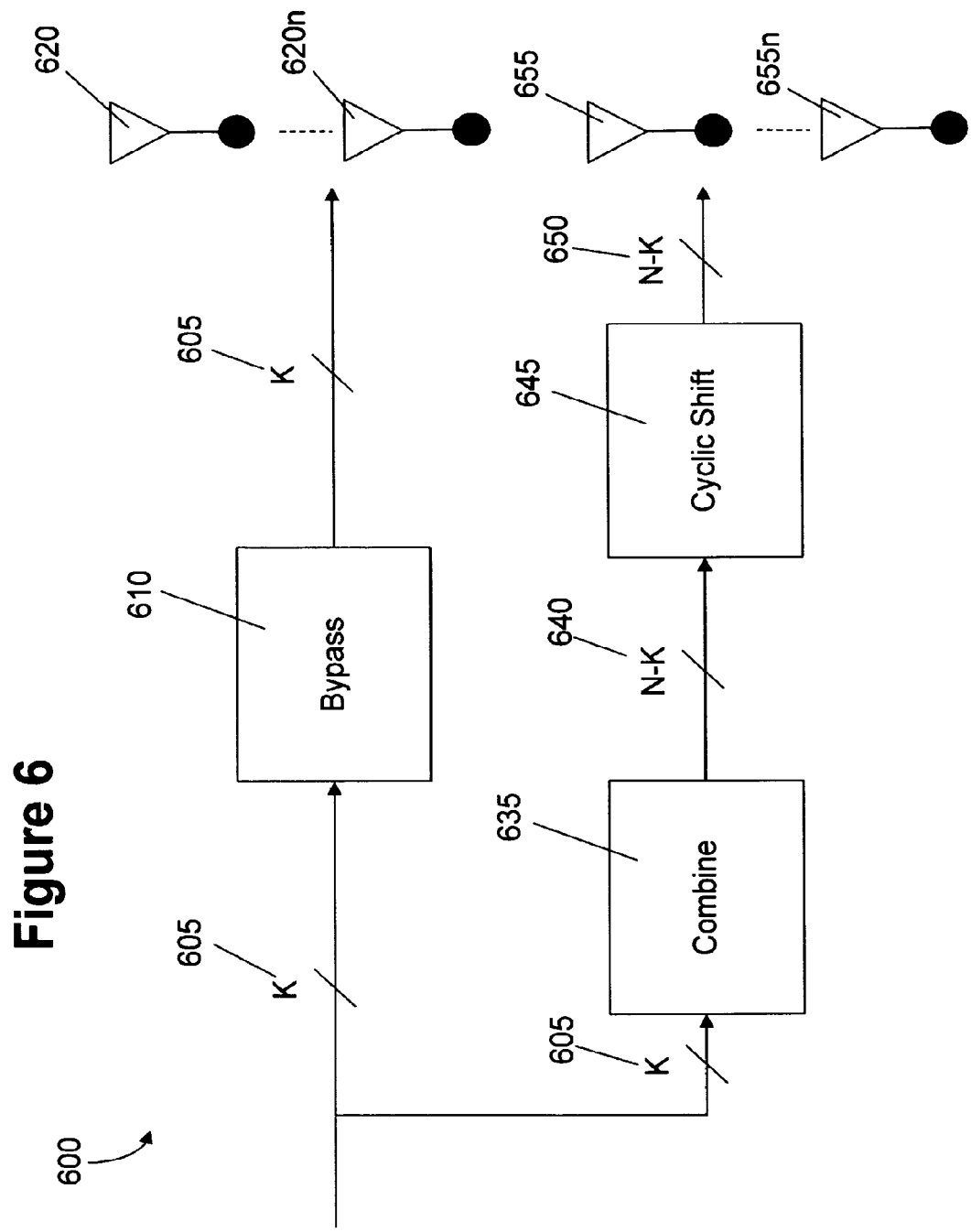
FIG. 6 is a block diagram of an exemplary embodiment of the system for transmitter diversity expansion of FIG. 3 with the combine module before the cyclic shift module.

An alternative transmitter diversity expansion system 600 for performing the cyclic shift and combine functions is provided in FIG. 6. Again, K spatial streams 605 are sent through bypass module 610 to K base antennas 620 ... 620n. K spatial streams 605 are also combined in module 635 by applying a unitary matrix to produce N-K streams 640. A cyclic shift is then applied to N-K streams 640 in cyclic shift module 645 to produce N-K cyclic shifted streams 650, which are applied to N-K extension antennas 655 ... 655n. As a non-limiting example of two spatial streams, two spatial streams 605 are sent through bypass module 610 to two base antennas 620, 620n and the two spatial streams 605 are combined in module 635 by applying a unitary matrix to produce two combined streams 640. Those two combined streams 640 are sent to cyclic shift module 645 where they are shifted to produce two (N-K) shifted streams 650 that are applied to two (N-K) base antennas 655, 655n.

In an alternative embodiment, the combining module precedes the cyclic shift module as shown in FIG. 6. This embodiment also represents a linear operation, which can be represented with a matrix multiplication containing the two aforementioned matrices of cyclic shifts and combining in reversed order as follows:

$$W_{ext} = W_{cs} * W_{combine}$$

where the $W_{combine}$ matrix defines the combining operation and the $W_{cs}$ matrix defines the cyclic shifts. In this case, the vector of the K base signals is loaded in the order of the K streams. This vector of base signals is left-multiplied with the combining matrix to form N-K extension streams. The N-K extension streams are left-multiplied with the cyclic shift matrix $W_{cs}$. Again, the combining matrix $W_{combine}$ may be based on Walsh-Hadamard construct and trimmed as needed. N-K rows are retained for N-K extension antennas. K columns are retained for the K spatial streams. An exemplary embodiment for extending two data streams to two extension antennas for a total of four antennas is represented as follows:

[Extend1]=[CS1 0][1 1][Base1]
[Extend2][0 CS2][1 -1][Base2]

Figure 7:
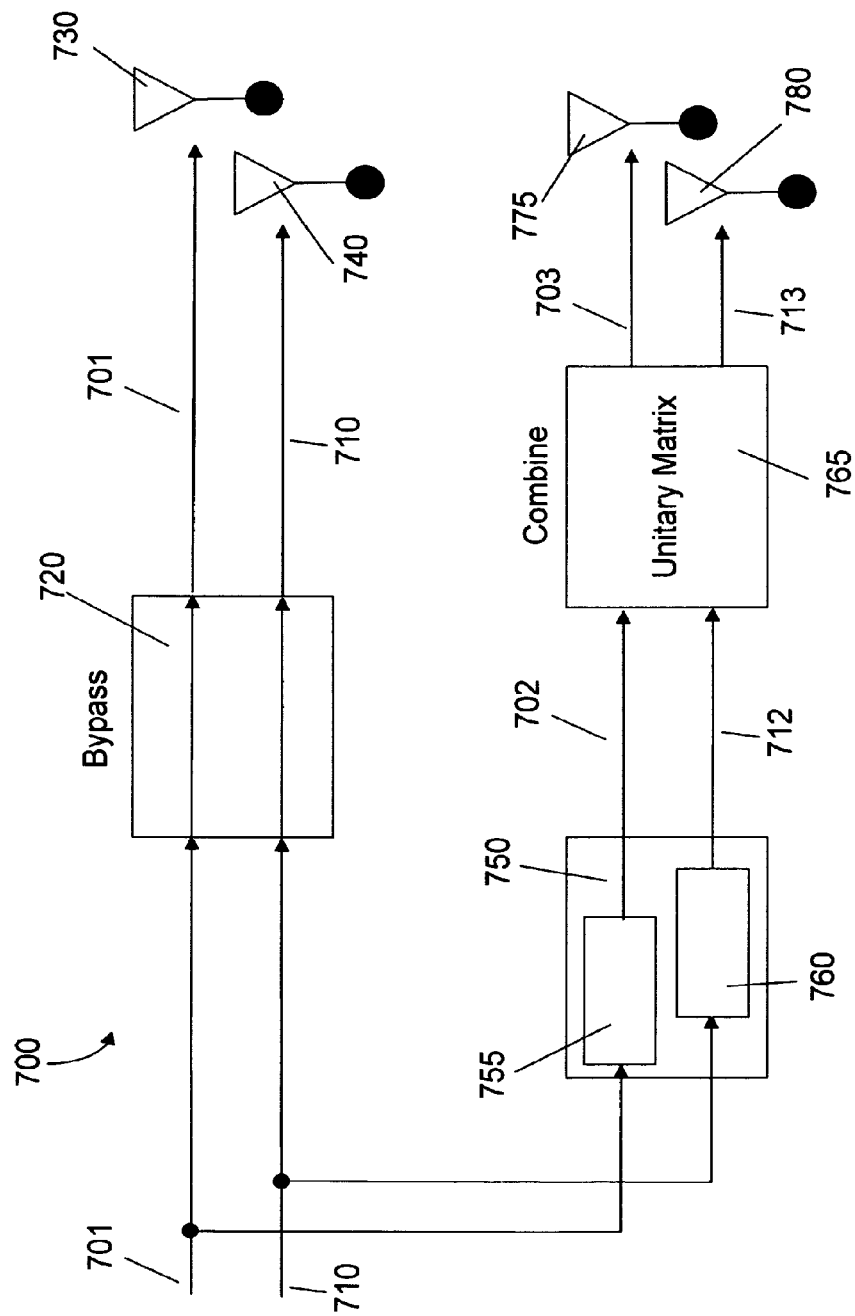
FIG. 7 is a block diagram of an exemplary embodiment of the system for transmitter diversity expansion of FIG. 5 with two data stream inputs and four transmit antennas.

FIG. 7 provides another exemplary embodiment of a transmitter diversity expansion system 700 with two spatial stream inputs 701, 710 and four antennas 730, 740, 770, 780. Both streams 701, 710 pass through bypass module 720 and are applied unchanged to base antennas 730, 740 respectively. Streams 701, 710 are also applied to cyclic shift module 750. Stream 701 is shifted by cyclic shift submodule 755 and stream 710 is shifted by cyclic shift submodule 760, both within cyclic shift module 750. Cyclic shift submodule 755 shifts stream 701 by more or less than cyclic shift submodule 760 shifts stream 710, but not by the same amount. Stream 702 is the shifted version of stream 701. Stream 712 is the shifted version of stream 710. Streams 702, 712 are provided to combining module 765 in which a unitary or extension matrix is applied to the streams to produce streams 703 and 713. Streams 703 and 713 are applied to extension antennas 775 and 780. In this exemplary embodiment, streams 701, 710, 703, 713 are transmitted from respective antennas 730, 740, 775, 780 substantially simultaneously.

Figure 8:
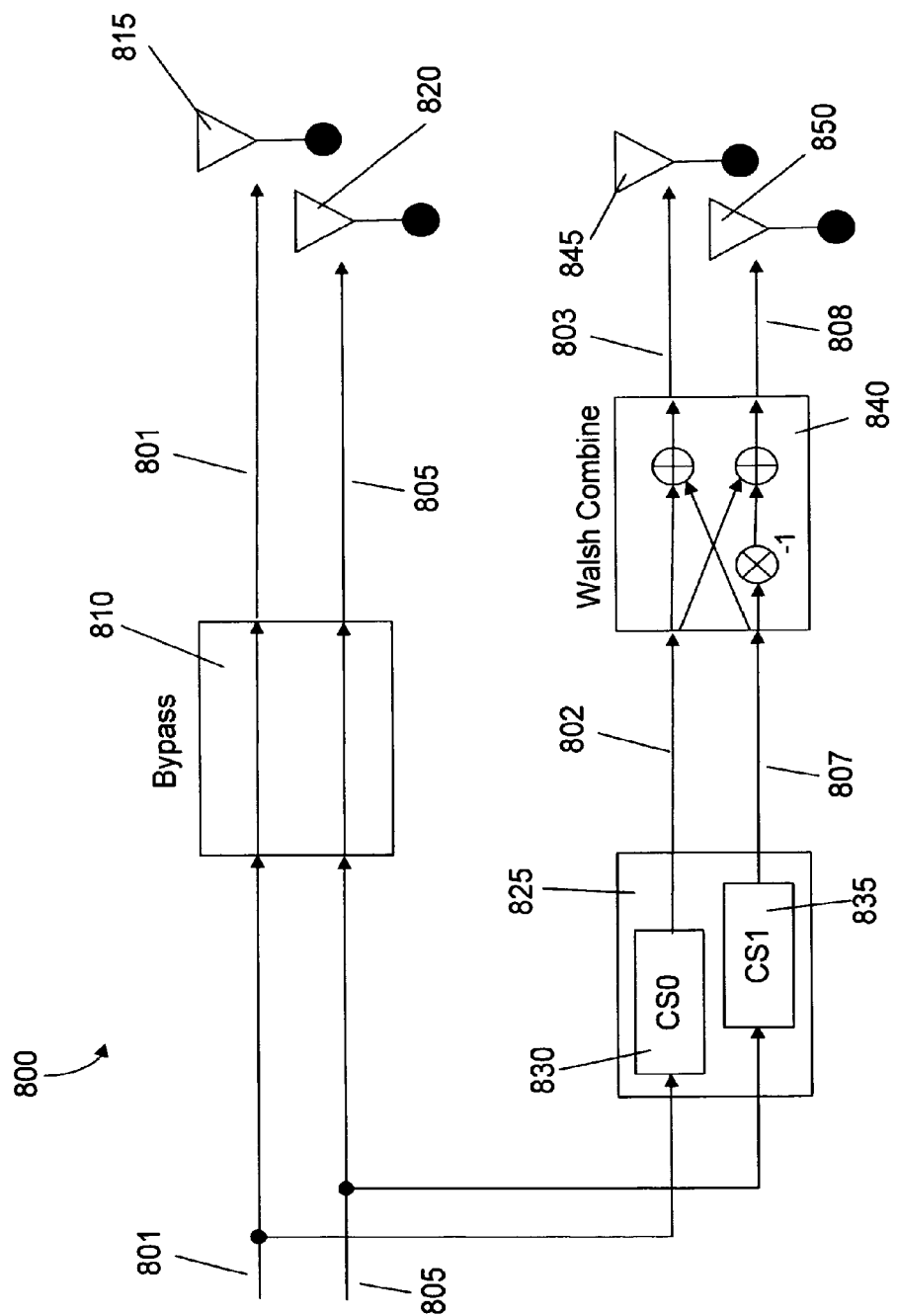
FIG. 8 is a block diagram of an exemplary embodiment of the system for transmitter diversity expansion of FIG. 7 with a Walsh combination matrix.

FIG. 8 is a similar exemplary embodiment of a transmitter diversity expansion system 800 in which a Walsh matrix is used to perform the combining module. Both streams 801, 805 pass through bypass module 810 and are applied unchanged to base antennas 815, 820 respectively. Streams 801, 805 are also applied to cyclic shift module 825. Stream 801 is shifted by cyclic shift submodule 830 and stream 805 is shifted by cyclic shift submodule 835, both within cyclic shift module 825. Cyclic shift submodule 830 shifts stream 801 by more or less than cyclic shift submodule 835 shifts stream 805, but not by the same amount. Stream 802 is the shifted version of stream 801. Similarly, stream 807 is the shifted version of stream 805. Streams 802, 807 are provided to combining module 840 in which a Walsh-Hadamard combining matrix is applied to the streams to produce streams 803 and 808. Streams 803 and 808 are applied to extension antennas 845 and 850. In this exemplary embodiment, streams 801, 805, 803, 808 are transmitted from respective antennas 815, 820, 845, 850 substantially simultaneously.

Figure 9:
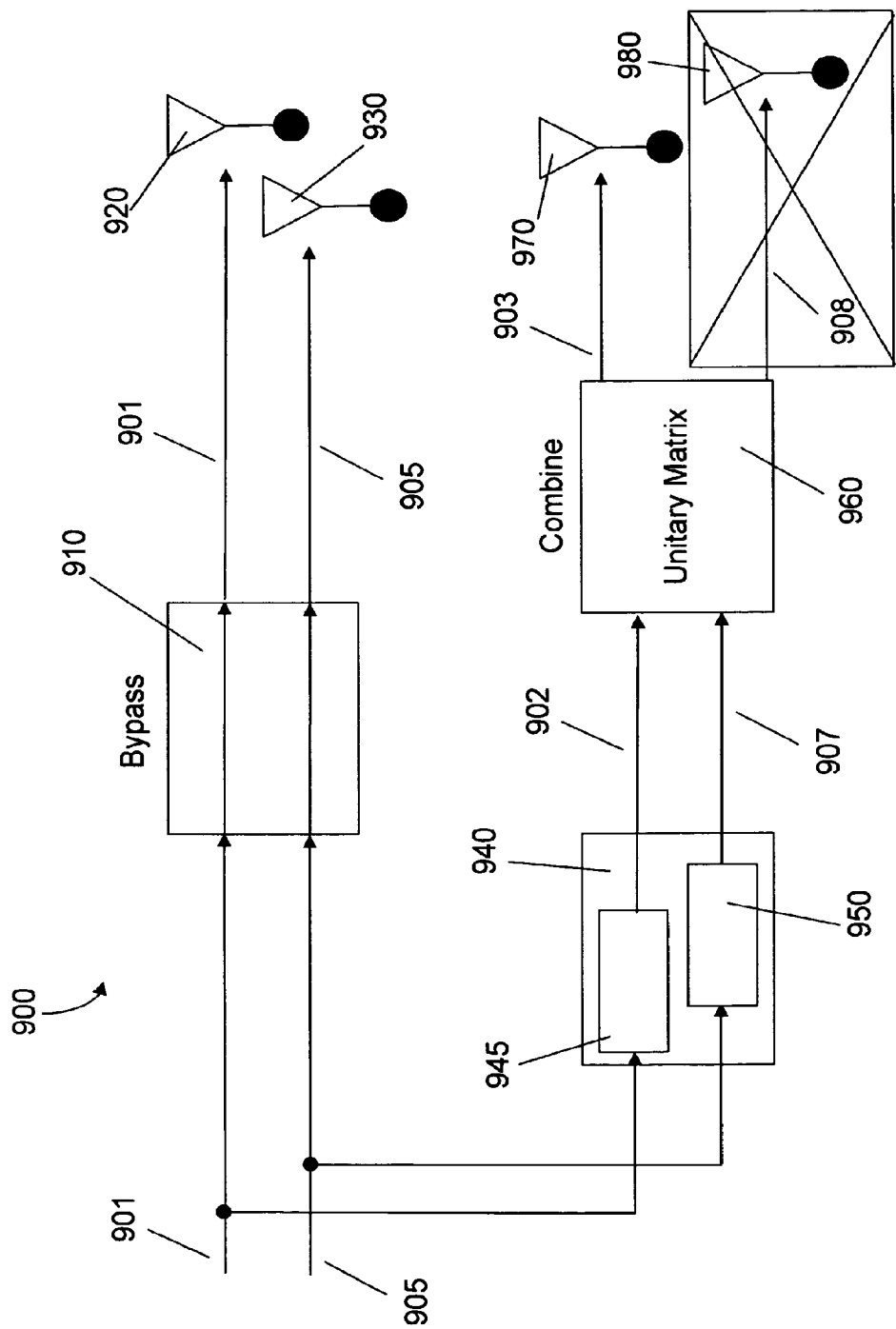
FIG. 9 is a block diagram of an exemplary embodiment of the system for transmitter diversity expansion of FIG. 5 with two data stream inputs and three transmit antennas.

Referring now to FIG. 9, an exemplary embodiment of a transmitter diversity expansion system 900 is provided for two spatial stream inputs with three antennas. Both streams 901, 905 pass through bypass module 910 and are applied unchanged to base antennas 920, 930 respectively. Streams 901, 905 are also applied to cyclic shift module 940. Stream 901 is shifted by cyclic shift submodule 945 and stream 905 is shifted by cyclic shift submodule 950, both within cyclic shift module 940. Cyclic shift submodule 945 shifts stream 901 by more or less than cyclic shift submodule 950 shifts stream 905, but not by the same amount. Stream 902 is the shifted version of stream 901. Stream 907 is the shifted version of stream 905. Streams 902, 907 are provided to combining module 960 to produce streams 903 and 908. If two extension antennas were being used, streams 903 and 908 would be applied to extension antennas 970 and 980. However, since only one extension antenna 970 is used in this embodiment, only stream 903 is provided to extension antenna 970. Stream 908 is pruned or discarded. In this exemplary embodiment, streams 901, 905, 903 are transmitted from respective antennas 920, 930, 970 substantially simultaneously.

Figure 10:
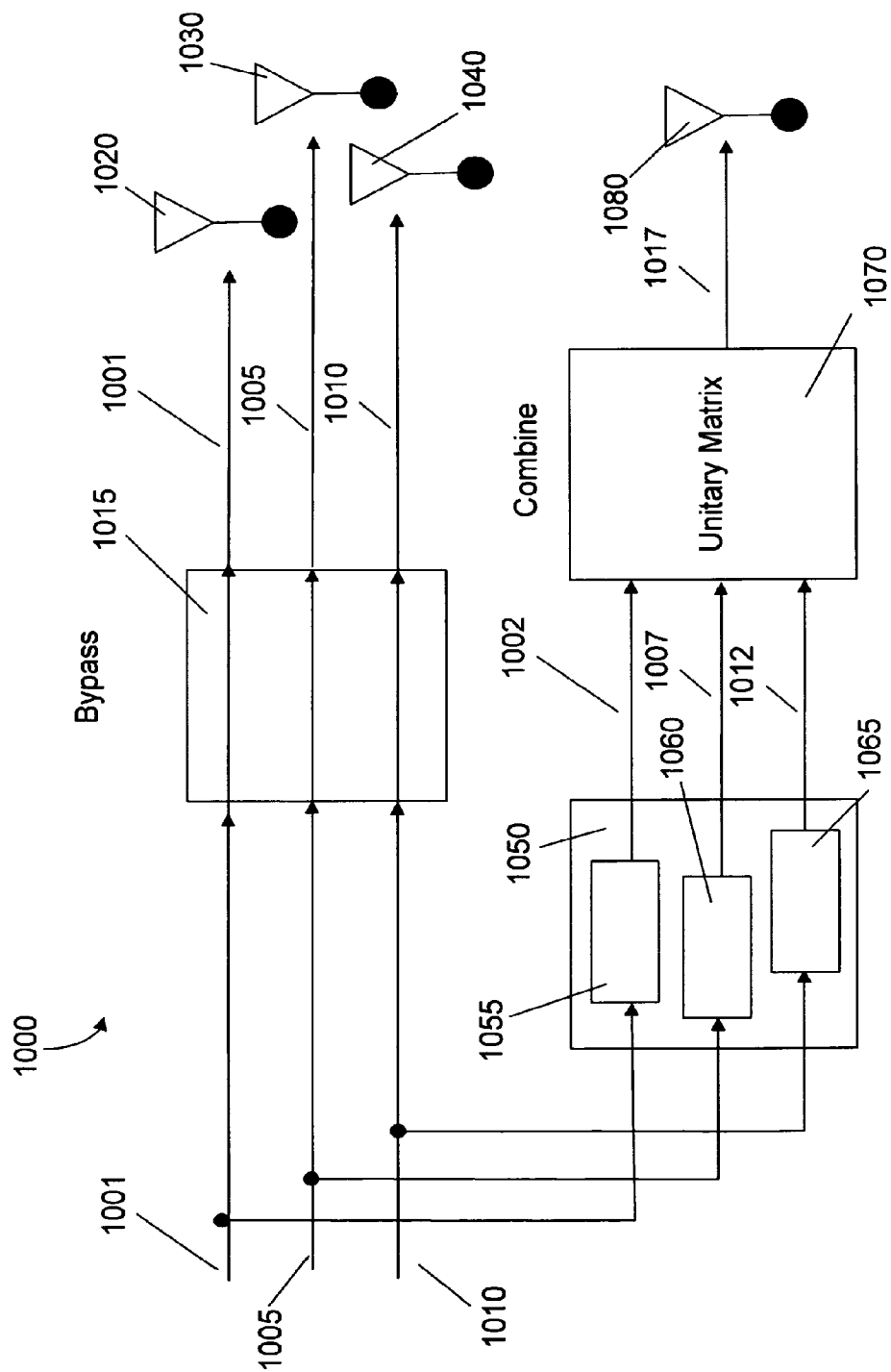
FIG. 10 is a block diagram of an exemplary embodiment of the system for transmitter diversity expansion of FIG. 5 with three data stream inputs and four transmit antennas.

Referring now to FIG. 10, an exemplary embodiment of a transmitter diversity expansion system 1000 is provided for three spatial stream inputs with four antennas. Streams 1001, 1005, 1010 pass through bypass module 1015 and are applied unchanged to base antennas 1020, 1030, 1040 respectively. Streams 1001, 1005, 1010 are also applied to cyclic shift module 1050. Stream 1001 is shifted by cyclic shift submodule 1055, stream 1005 is shifted by cyclic shift submodule 1060, and stream 1010 is shifted by cyclic shift submodule 1065, all within cyclic shift module 1050. Each cyclic shift submodule 1055, 1060, 1065 shifts streams 1001, 1005, 1010 by more or less than the other two cyclic shift submodules. Stream 1002 is the shifted version of stream 1001. Stream 1007 is the shifted version of stream 1005. Stream 1012 is the shifted version of stream 1010. Streams 1002, 1007, 1012 are provided to combining module 1070 to produce streams 1017. If three extension antennas were being used, three streams would be applied to the extension antennas. However, since only one extension antenna 1080 is used in this embodiment, only stream 1017 is applied to extension antenna 1080. The other streams are pruned or discarded. In this exemplary embodiment, streams 1001, 1005, 1010, 1017 are transmitted from respective antennas 1020, 1030, 1040, 1080 substantially simultaneously.

Figure 11:
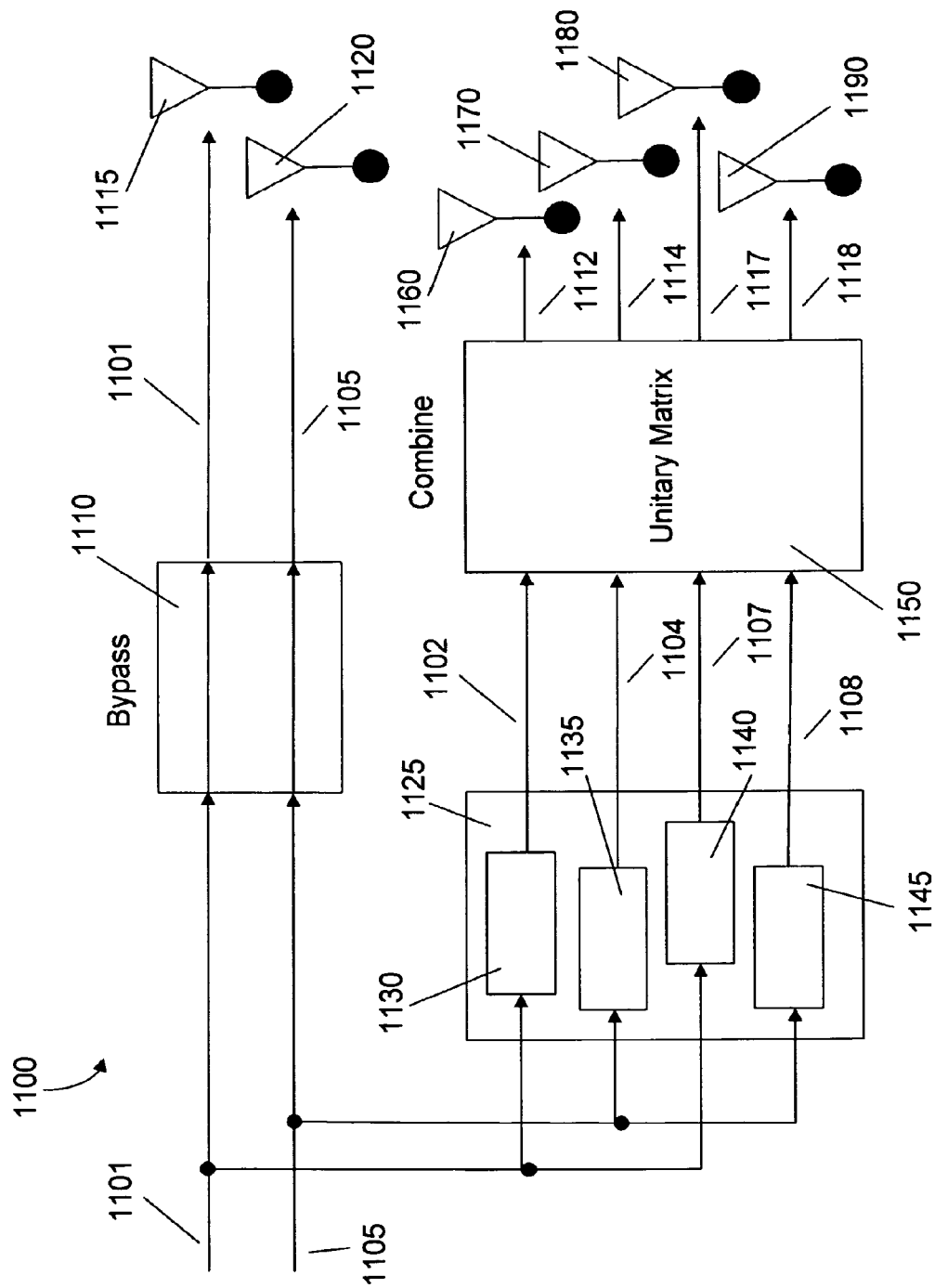
FIG. 11 is a block diagram of an exemplary embodiment of the system for transmitter diversity expansion of FIG. 5 with two data stream inputs and six transmit antennas.

Referring now to FIG. 11, an exemplary embodiment of a transmitter diversity expansion system 1100 is provided for two spatial stream inputs with six antennas—two base antennas and four extension antennas. Streams 1101, 1105 pass through bypass module 1110 and are applied unchanged to base antennas 1115, 1120 respectively. Streams 1101, 1105 are also applied to cyclic shift module 1125. Stream 1101 is shifted by both cyclic shift submodule 1130 and cyclic shift submodule 1140. Stream 1105 is shifted by both cyclic shift submodule 1135 and cyclic shift submodule 1145. Cyclic shift submodules 1130, 1135, 1140, 1145 are located within cyclic shift module 1125. Each cyclic shift submodule 1130, 1135, 1140, 1145 shifts streams 1101, 1105 by more or less than the other three cyclic shift submodules. Streams 1102, 1107 are shifted versions of stream 1101. Streams 1104, 1108 are shifted versions of stream 1105. Streams 1102, 1104, 1107, 1108 are provided to combining module 1150 to produce streams 1112, 1114, 1117, 1118. In this exemplary embodiment, streams 1101, 1105, 1112, 1114, 1117, 1118 are transmitted from respective antennas 1115, 1120, 1160, 1170, 1180, 1190 substantially simultaneously. The functionality of each module described hereinabove may be distributed among one or more modules. Likewise, the entire functionality described hereinabove may be combined within a single module for some embodiments.

Figure 12:
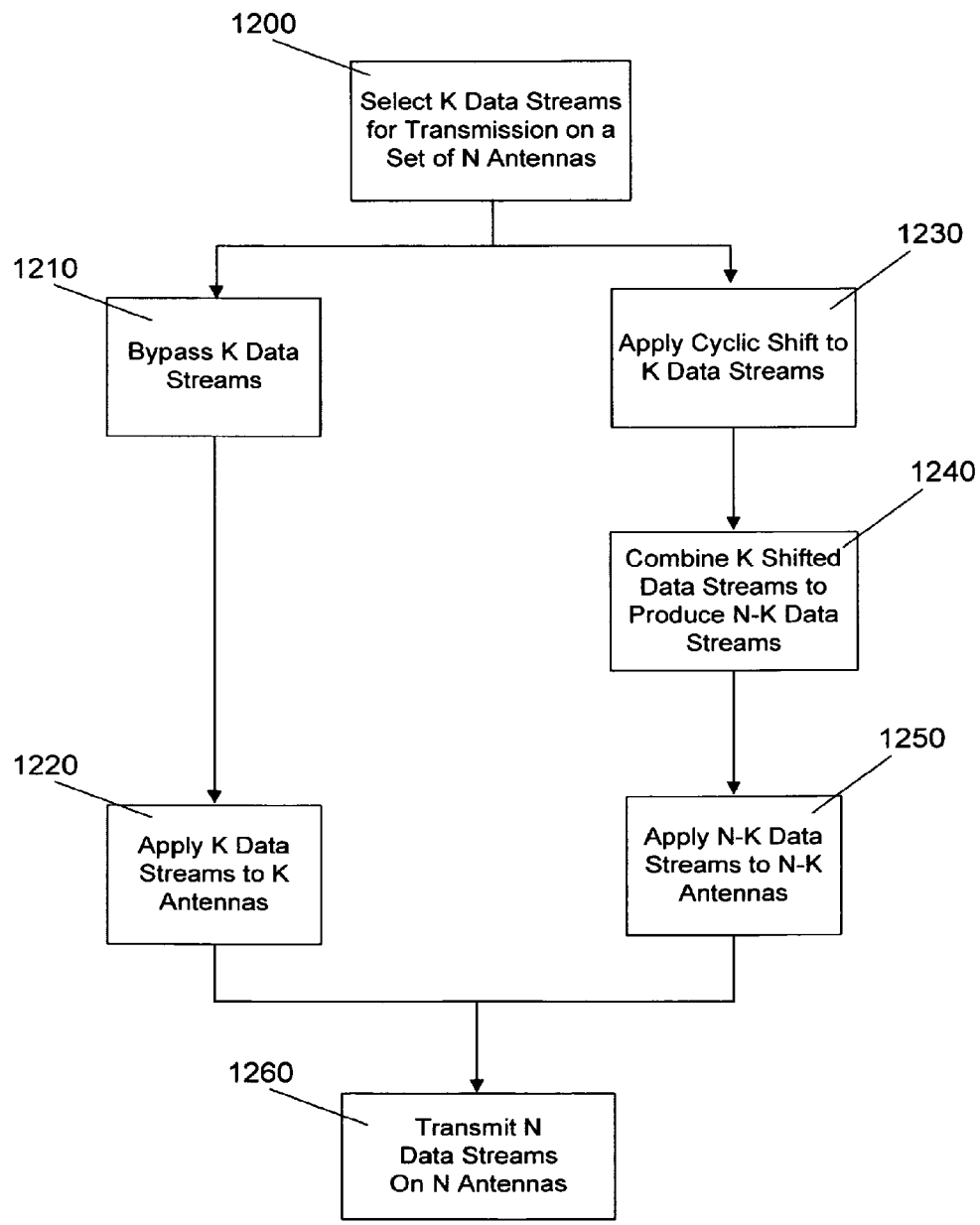
FIG. 12 is a flow diagram of an exemplary method embodiment of the system for transmitter diversity expansion of FIG. 5.

A flow diagram of an embodiment of a transmitter diversity expansion method 1200 is provided in FIG. 12. This flow diagram is based on the exemplary embodiment with the cyclic shift module first, followed by the combining module as provided in FIG. 5. In block 1202, K spatial streams are selected for transmission on a set of N antennas, where N is greater than K. In block 1210, the K spatial streams pass through a bypass module. In block 1220 the K spatial streams are applied to K base antennas. In block 1230, a cyclic shift is applied to the K data streams to produce K shifted spatial streams. In block 1240, the K shifted spatial streams are combined to produce N-K spatial streams. In block 1250, the N-K spatial streams are applied to N-K extension antennas. In block 1260, the combined K unchanged spatial streams and N-K shifted/combined spatial streams are transmitted on N antennas comprising K base antennas and N-K extension antennas.

Figure 13:
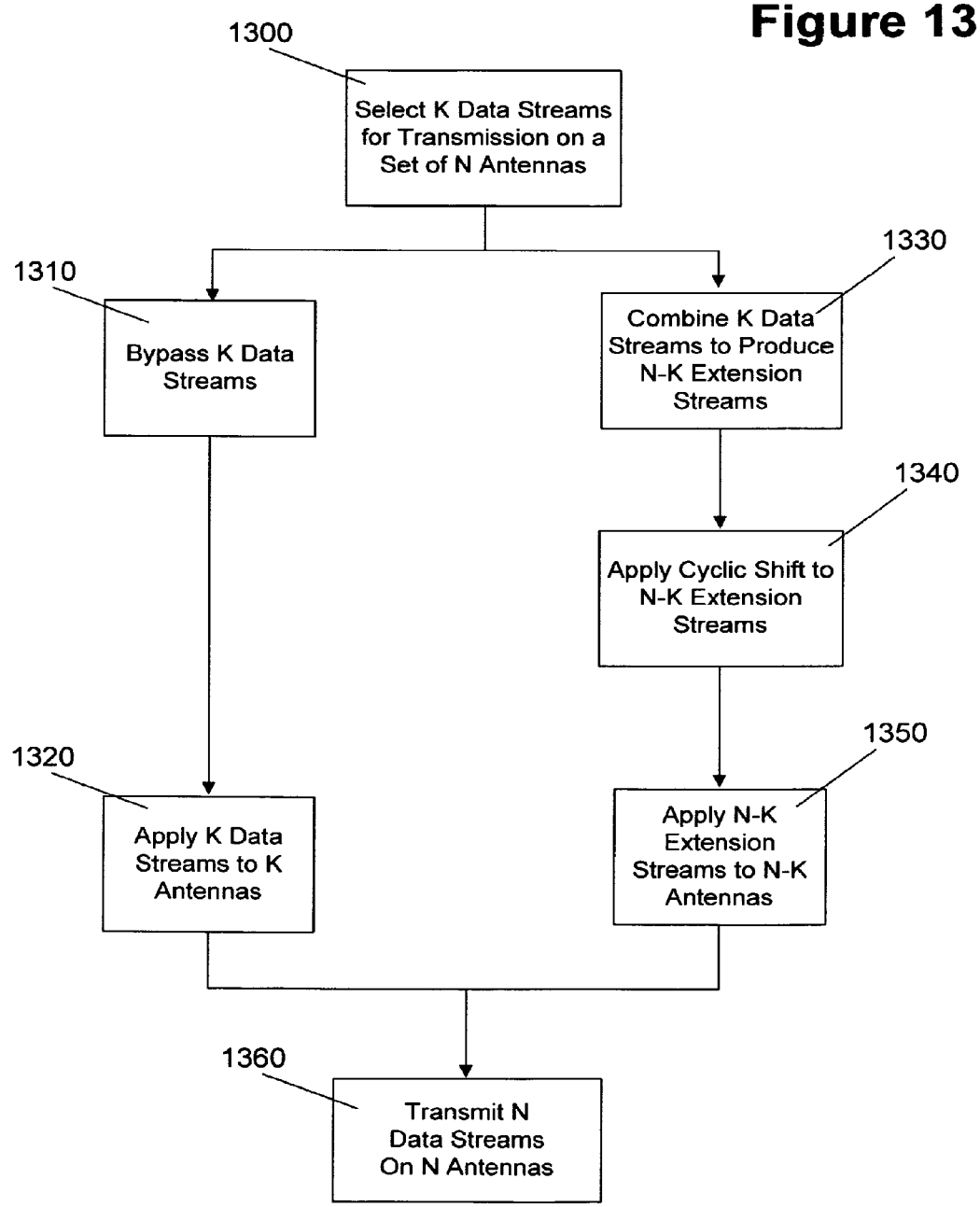
FIG. 13 is a flow diagram of an exemplary method embodiment of the system for transmitter diversity expansion of FIG. 6.

Another flow diagram of an embodiment of a transmitter diversity expansion method 1300 is provided in FIG. 13. This flow diagram is based on the exemplary embodiment with the combining operation first, followed by cyclic shift operation as provided in FIG. 6. In block 1302, K spatial streams are selected for transmission on a set of N antennas, where N is greater than K. In block 1310, the K spatial streams pass through a bypass module. In block 1320 the K spatial streams are applied to K base antennas. In block 1330, K data streams are combined to produce N-K extension streams. In block 1340, a cyclic shift is applied to the N-K extension streams. In block 1350, the N-K extension streams are applied to N-K extension antennas. In block 1360, the combined K unchanged spatial streams and N-K shifted/combined spatial streams are transmitted on N antennas comprising K base antennas and N-K extension antennas.

In summation, extra transmit antennas are exploited using a systematic mapping method of expanding spatial input streams such that a receiver does not need to be aware of any special coding.

Exemplary embodiments of the present disclosure can be implemented in hardware, software, firmware, or a combination thereof. In the preferred embodiment(s), transmitter diversity expansion systems and methods are implemented in software or firmware that is stored in a memory and that is executed by a suitable instruction execution system. If implemented in hardware, as in an alternative embodiment, the systems and methods of the preferred embodiments can be implemented with any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

The flow diagrams of FIGS. 12 and 13 show the architecture, functionality, and operation of possible implementations of the transmitter diversity expansion software implementing transmitter diversity expansion methods. In this regard, each block represents a module, segment, or portion of code, which comprises one or more executable instructions for implementing the specified logical function(s). It should also be noted that in some alternative implementations, the functions noted in the blocks may occur out of the order noted in FIGS. 12 and 13. For example, two blocks shown in succession in FIG. 12 may in fact be executed substantially concurrently or the blocks may sometimes be executed in the reverse order, depending upon the functionality involved, as would be understood by those reasonably skilled in the art of the present disclosure.

The transmitter diversity expansion program, which may comprise an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory. In addition, the scope of the present disclosure includes embodying the functionality of the preferred embodiments of the present disclosure in logic embodied in hardware or software-configured mediums.

It should be emphasized that the above-described embodiments of the present disclosure, particularly, any "preferred" embodiments, are merely possible examples of implementations, set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and protected by the following claims.

Therefore, at least the following is claimed:

1. A system comprising:
a transmit processor configured to generate a set of one or more extension data streams based on a set of base data streams, wherein at least one data stream of the set of one or more extension data streams is the product of a matrix multiplication of the set of base data streams with a unitary matrix wherein the transmit processor is communicatively coupled to a set of base antennas and a set of one or more expansion antennas, wherein each base antenna is configured to transmit a corresponding one of the base data streams, and wherein each expansion antenna is configured to transmit a corresponding one of the extension data streams.

2. The system of claim 1, wherein the set of one or more extension data streams comprises at least one data stream corresponding to a cyclically-shifted combination of the data streams of the set of base data streams.

3. The system of claim 1, wherein at least one data stream of the set of base data streams is cyclically-shifted before it is combined with the other data streams of the set of base data streams to generate the set of one or more extension data streams.

4. The system of claim 1, wherein the transmit processor is configured to combine the set of base data streams into a combined data stream, and to cyclically-shift the combined data stream to generate at least one extension data stream of the set of one or more extension data streams.

5. The system of claim 1, wherein the transmit processor is configured to cyclically-shift at least one data stream of the set of base data streams, and to combine the at least one cyclically-shifted data stream with at least one other data stream of the set of base data streams to generate at least one extension data stream of the set of one or more extension data streams.

6. The system of claim 1, wherein the unitary matrix is one of a Fourier Transform matrix or a Walsh matrix.

7. The system of claim 1, wherein the quantity of base data streams is equal to the quantity of extension data streams.

8. The system of claim 1, wherein the quantity of base data streams is greater than the quantity of extension data streams.

9. A system comprising:
means for generating a set of one or more extension data streams based on a set of base data streams, wherein at least one data stream of the set of one or more extension data streams is the product of a matrix multiplication of the set of base data streams with a unitary matrix, wherein the means for generating is communicatively coupled to a set of means for transmitting the base data streams and a set of one or more means for transmitting the set of one or more extension data streams.

10. The system of claim 9, wherein the set of one or more extension data streams comprises at least one data stream corresponding to a cyclically-shifted combination of the data streams of the set of base data streams.

11. The system of claim 9, wherein at least one data stream of the set of base data streams is cyclically-shifted before it is combined with the other data streams of the set of base data streams to generate the set of one or more extension data streams.

12. The system of claim 9, wherein the means for generating comprises:
means for combining the set of base data streams into a combined data stream; and
means for cyclically-shifting the combined data stream to generate at least one extension data stream of the set of one or more extension data streams.

13. The system of claim 9, wherein the means for generating comprises:
means for cyclically-shifting at least one data stream of the set of base data streams; and
means for combining the at least one cyclically-shifted data stream with at least one other data stream of the set of base data streams to generate at least one extension data stream of the set of one or more extension data streams.

14. The system of claim 9, wherein the unitary matrix is one of a Fourier Transform matrix or a Walsh matrix.

15. The system of claim 9, wherein the quantity of base data streams is equal to the quantity of extension data streams.

16. The system of claim 9, wherein the quantity of base data streams is greater than the quantity of extension data streams.

17. A method comprising:
generating a set of one or more extension data streams based on a set of base data streams, wherein at least one data stream of the set of one or more extension data streams is the product of a matrix multiplication of the set of base data streams with a unitary matrix; and
initiating the transmission of each data stream of the sets of base and one or more extension data streams from a separate corresponding transmit antenna.

18. The method of claim 17, wherein the set of one or more extension data streams comprises at least one data stream corresponding to a cyclically-shifted combination of the data streams of the set of base data streams.

19. The method of claim 17, wherein at least one data stream of the set of base data streams is cyclically-shifted before it is combined with the other data streams of the set of base data streams to generate the set of one or more extension data streams.

20. The method of claim 17, wherein generating the set of one or more extension data streams based on the set of base data streams comprises:
 combining the set of base data streams into a combined data stream; and cyclically-shifting the combined data stream to generate at least one extension data stream of the set of one or more extension data streams.

21. The method of claim 17, wherein generating a set of one or more extension data streams based on a set of base data streams comprises:
 cyclically-shifting at least one data stream of the set of base data streams; and
 combining the at least one cyclically-shifted data stream with at least one other data stream of the set of base data streams to generate at least one extension data stream of the set of one or more extension data streams.

22. The method of claim 17, wherein the unitary matrix is one of a Fourier Transform matrix or a Walsh matrix.

23. The method of claim 17, wherein initiating the transmission of each data stream of the sets of base and one or more extension data streams from a separate corresponding transmit antenna comprises:
 initiating the transmission each base data stream from a corresponding base transmit antenna; and
 initiating the transmission of each expansion data stream for a corresponding extension transmit antenna.

24. The method of claim 17, wherein the quantity of base data streams is equal to the quantity of extension data streams.

25. The method of claim 17, wherein the quantity of base data streams is greater than the quantity of extension data streams.

* * * * *

UNITED STATES PATENT AND TRADEMARK OFFICE
CERTIFICATE OF CORRECTION

| | | |
|---|---|---|
| PATENT NO. | : 7,949,068 B2 | Page 1 of 1 |
| APPLICATION NO. | : 12/698090 | |
| DATED | : May 24, 2011 | |
| INVENTOR(S) | : Webster et al. | |

It is certified that error appears in the above-identified patent and that said Letters Patent is hereby corrected as shown below:

Title page, item (54), under "Title", in Column 1, Lines 1-2, delete "Systems and Methods for Transmitter Diversity" and insert -- Systems and Methods for Transmitter Diversity Expansion --.

Column 1, lines 1-2, delete "Systems and Methods for Transmitter Diversity" and insert -- Systems and Methods for Transmitter Diversity Expansion --.

Column 1, line 5, delete "APPLICATION" and insert -- APPLICATIONS --.

Column 1, line 10, delete "2005." and insert -- 2005, which has now expired. --.

Column 11, line 47, in Claim 1, delete "matrix" and insert -- matrix, --.

Column 11, line 49, in Claim 1, delete "expansion antennas," and insert -- extension antennas, --.

Column 11, lines 51-52, in Claim 1, delete "expansion antenna" and insert -- extension antenna --.

Column 14, line 11, in Claim 23, delete "expansion data stream" and insert -- extension data stream --.

Signed and Sealed this
Twenty-fourth Day of April, 2012

David J. Kappos
*Director of the United States Patent and Trademark Office*